(12) United States Patent
Noyori

(10) Patent No.: US 8,188,667 B2
(45) Date of Patent: May 29, 2012

(54) LIGHTING DEVICE AND LIGHTING SYSTEM FOR A VEHICLE

(75) Inventor: Yasushi Noyori, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 485 days.

(21) Appl. No.: 12/393,095

(22) Filed: Feb. 26, 2009

(65) Prior Publication Data
US 2009/0212706 A1 Aug. 27, 2009

(30) Foreign Application Priority Data

Feb. 27, 2008 (JP) .................. 2008-046112

(51) Int. Cl.
*B60Q 1/02* (2006.01)
*G01S 13/00* (2006.01)
(52) U.S. Cl. ........ 315/82; 315/159; 315/307; 250/214 D
(58) Field of Classification Search .................. 315/82, 315/77, 159, 149, 307, 291; 250/214 D
See application file for complete search history.

(56) References Cited

U.S. PATENT DOCUMENTS

2004/0036586 A1 * 2/2004 Harooni ................. 340/435
2005/0179393 A1 8/2005 Murakami et al.

FOREIGN PATENT DOCUMENTS

JP 11-291815 A 10/1999
JP WO 2007/090292 A1 8/2007

OTHER PUBLICATIONS

Extended European Search Report dated Dec. 1, 2011, issued by the European Patent Office in counterpart application No. 09002736.8.

* cited by examiner

*Primary Examiner* — Daniel D Chang
(74) *Attorney, Agent, or Firm* — Sughrue Mion, PLLC

(57) ABSTRACT

A lighting device and a lighting system for a vehicle are provided. The lighting device includes a signal detecting portion which receives a light control direction signal; a control portion which controls a light source according to the light control direction signal; and a lighting state signal generating portion which outputs a lighting state signal based on the light control direction signal received by the signal detecting portion. The lighting system includes the lighting device and a light source.

7 Claims, 5 Drawing Sheets

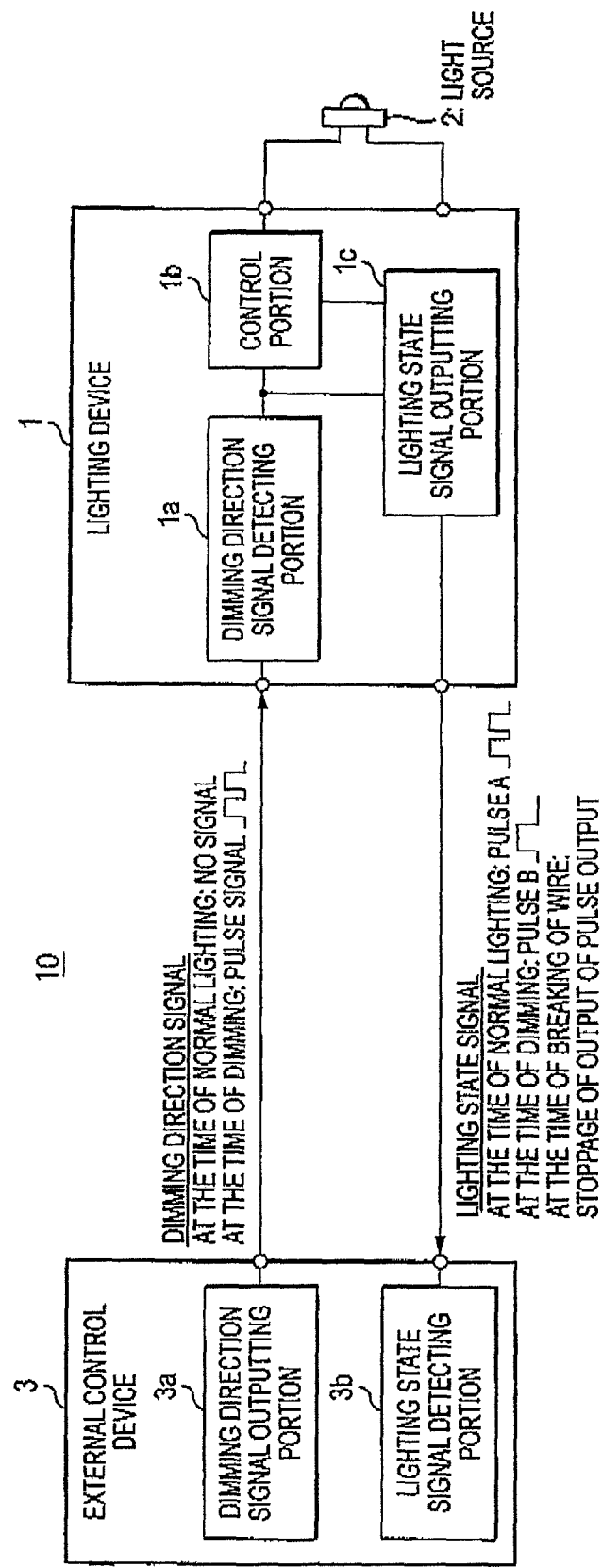

FIG. 2

|  |  | DIMMING DIRECTION SIGNAL | | LIGHTING STATE | LIGHTING STATE SIGNAL | DETERMINATION |
|---|---|---|---|---|---|---|
|  |  | OUTPUT | INPUT |  |  |  |
| AT THE NORMAL TIME | AT THE USUAL TIME | — | — | USUAL LIGHTING | PULSE A ⊓⊔⊓ | PULSE A IS OUTPUTTED WITHOUT GIVING DIMMING DIRECTION → IT IS JUDGED TO BE NORMAL STATE |
|  | AT THE DIMMING TIME | ⊓⊔⊓ | PULSE ⊓⊔⊓ | DIMMING LIGHTING | PULSE B ⊓⊔ | PULSE B IS OUTPUTTED WITH GIVING DIMMING DIRECTION → IT IS JUDGED TO BE NORMAL STATE |
| AT THE ABNORMAL TIME | AT THE TIME OF BREAKING OF WIRE OF DIMMING SIGNAL | ⊓⊔⊓ | — | USUAL LIGHTING | PULSE A ⊓⊔⊓ | PULSE A IS OUTPUTTED WITH GIVING DIMMING DIRECTION → IT IS JUDGED TO BE DIMMING SIGNAL ABNORMALITY STATE |
|  | AT THE TIME OF POWERING OF DIMMING SIGNAL | ⊓⊔⊓ | Hi-SIGNAL | USUAL LIGHTING | PULSE A ⊓⊔⊓ | PULSE A IS OUTPUTTED WITH GIVING DIMMING DIRECTION → IT IS JUDGED TO BE DIMMING SIGNAL ABNORMALITY STATE |
|  | AT THE TIME OF GROUNDING OF DIMMING SIGNAL | ⊓⊔⊓ | Lo-SIGNAL | USUAL LIGHTING | PULSE A ⊓⊔⊓ | PULSE A IS OUTPUTTED WITH GIVING DIMMING DIRECTION → IT IS JUDGED TO BE DIMMING SIGNAL ABNORMALITY STATE |
|  | AT THE TIME OF ABNORMALITY OF LIGHT SOURCE |  | · NO SIGNAL · PULSE SIGNAL | NO LIGHTING | STOPPAGE OF OUTPUT OF PULSE | PULSE IS STOPPED IRRESPECTIVE OF DIMMING DIRECTION → IT IS JUDGED THAT LED IS ABNORMAL |

LIGHTING DEVICE AND LIGHTING SYSTEM FOR A VEHICLE

TECHNICAL FIELD

Devices and systems consistent with the present invention relate to lighting devices and systems and, more particularly, to a lighting device and system which can detect failures.

DESCRIPTION OF THE RELATED ART

In a related-art lighting device, such as, for example, a lighting device used in a vehicle headlamp, when a dimming direction signal is received, an electric current to a light source is reduced so as to dim the light source. By contrast, when the dimming direction signal is not received, normal lighting of the light source is continued.

Official gazette of JP-A-11-291815 describes a related art technique for controlling a related art lighting device upon a failure. In the related art lighting device, at a time at which a failure occurs, a signal is sent to adjust a luminance of another light source. At the same time, a failure signal is sent in order to output a warning. For example, when a wire of headlamp of a vehicle breaks, the luminance of another headlamp is adjusted, and a warning that the headlamp is no longer functioning properly is sent to a driver of the vehicle.

However, the above-described related art lighting devices have some disadvantages. For example, in the related art lighting device, it is impossible to detect a failure of the signal line related to the dimming direction signal. Specifically, at a time of an occurrence of an abnormality or failure of various switches, it is impossible to detect the abnormality. Accordingly, no countermeasures can be taken against the abnormality or failure.

SUMMARY

Illustrative aspects of the prevent invention provide a lighting device for a vehicle which can detect a failure related to a dimming direction signal and further provide a lighting device which can detect a failure of a light source.

According to an illustrative aspect of the present invention, there is provided a lighting device for a vehicle. The lighting device comprises a signal detecting portion which receives a light control direction signal; a control portion which controls a light source according to the light control direction signal; and a lighting state signal generating portion which outputs a lighting state signal based on the light control direction signal received by the signal detecting portion.

According to another illustrative aspect of the present invention, there is provided a lighting system. The lighting system comprises a light source; an external control device; and a lighting device. The lighting device comprises a signal detecting portion which receives a light control direction signal from the external control device; a control portion which controls the light source according to the light control direction signal; and a lighting state signal generating portion which outputs a lighting state signal to the external control device, the lighting state signal generated based on the light control direction signal received by the signal detecting portion.

According to yet another illustrative aspect of the present invention, there is provided a lighting system. The lighting system comprises a vehicle headlamp; and a lighting device. The lighting device comprises a signal detecting circuit which receives a light control direction signal indicating a desired brightness level of the light source; a control circuit which controls a brightness level of the light source according to the light control direction signal; and a lighting state signal circuit which outputs a lighting state signal, the lighting state signal being a pulse cycle indicating the brightness level of the light source when the light source is operating in a normal condition, or a low level when the light source fails.

BRIEF DESCRIPTION OF THE DRAWINGS

FIG. 1 is a schematic view showing a lighting system according to an exemplary embodiment of the present invention.

FIG. 2 is an example of a table used for determining a condition of a lighting device of the lighting system of FIG. 1.

DETAILED DESCRIPTION OF EXEMPLARY EMBODIMENTS OF THE PRESENT INVENTION

Figure 3:
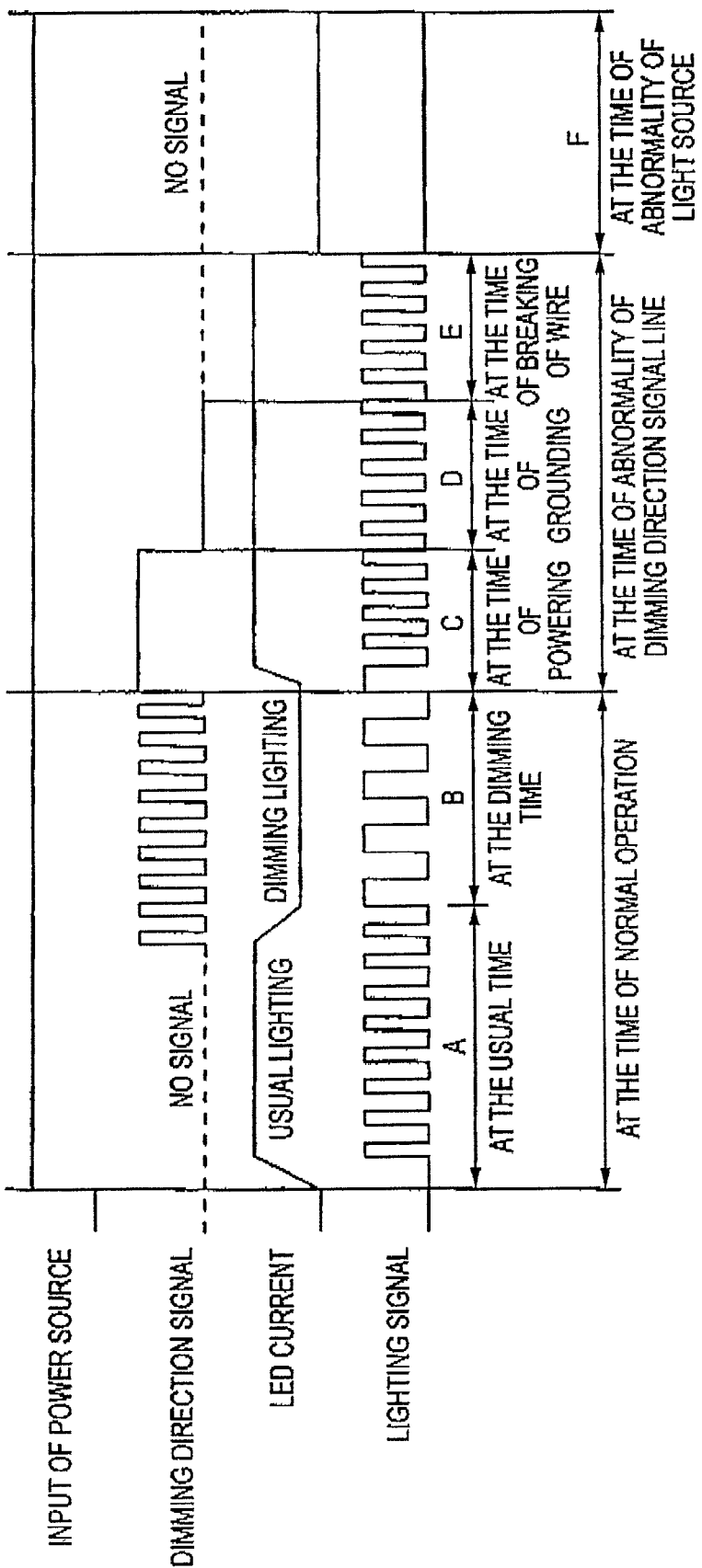
FIG. 3 is an example of a timing chart related to signaling performed by the lighting device.

FIG. 1 is a view showing a schematic of a lighting system for a vehicle according to an exemplary embodiment of the present invention, which will be explained below.

As shown in FIG. 1, the lighting system 10 for a vehicle includes a lighting device 1 and a light source 2. The lighting device 1 includes a dimming direction signal detecting portion 1a, a control portion 1b, and a lighting state signal outputting portion 1c, wherein the lighting device 1 can freely communicate with an external control device 3. The external control device 3 is coupled to the lighting device 1 through a signal line at least related to a dimming direction signal and also through a signal line related to a lighting state signal so that the external control device 3 can freely communicate with the lighting device 1. The external control device 3 includes a dimming direction signal outputting portion 3a and a lighting state signal detecting portion 3b.

The direction signal detecting portion corresponds to the dimming direction signal detecting portion 1a. The light control direction signal is a broader concept including the dimming direction signal. The lighting state signal generating portion corresponds to the lighting state signal outputting portion 1c.

During normal operation, i.e., in a case in which no dimming is instructed, no dimming direction signal is output from the dimming direction signal outputting portion 3a of the external control device 3 to the dimming direction signal detecting portions 1a of the lighting device 1. Consequently, the control portion 1b controls the light source 2 to operate under normal lighting conditions, and controls the lighting state signal outputting portion 1c to output a pulse cycle A from the lighting state signal outputting portion 1c to the lighting state signal detecting portion 3b. Thus, the external control device 3 can determine that the light source 2 is operating in a normal state.

On the other hand, when dimming is instructed, a dimming direction signal is output from the dimming direction outputting portion 3a to the dimming direction signal detecting portion 1a. Accordingly, the control portion 1b controls the light source 2 to dim the light source. Also, at a time of dimming, the control portion 1b changes a pulse cycle of the lighting state signal sent from the lighting state signal outputting portion 1c of the lighting device 1 to the lighting state signal detecting portion 3b of the external control device 3 to a pulse cycle B, which is different from pulse cycle A. Thus, the external control device 3 may detect that the dimming direction signal has been properly received by the lighting device 1.

On the other hand, when a failure occurs with respect to the signal line related to the dimming direction signal, i.e., on the signal line between the dimming direction signal outputting portion 3a and the dimming direction signal detecting portion 1a, the dimming direction signal will not be received by the dimming direction signal detecting portion 1a. Accordingly, the control portion 1b will not control the light source 2 to dim the light source, and will not control the lighting state signal outputting portion 1c to change the pulse cycle to the pulse cycle B. The external control device 3 may then use the disparity between the dimming direction signal and the lighting state signal to determine that a failure has occurred. That is, in the case of a failure of the signal line related to the dimming direction signal, although the external control device 3 outputs a dimming direction signal to the lighting device 1, the external control device 3 detects the pulse cycle A, which corresponds to normal operation, rather than the pulse cycle B which the external control device 3 expects to receive. Accordingly, the external control device 3 may detect that a failure has occurred.

To describe the communication in another way, the control portion 1b should change a pulse cycle at the time of dimming; however, the pulse A of the normal pulse cycle is continuously outputted. Therefore, the external control device 3 can determine that a failure has occurred on the signal line related to the dimming direction signal.

Additionally, the control portion 1b is configured such that if the light source 2 or a wire of the light source 2 is broken, the control portion 1b controls the lighting state signal outputting portion 1c to stop the output of the pulse cycle completely. In other words, in this case no lighting state signal is output. Therefore, it is possible for the external control device 3 to distinguish between a failure with respect to the signal line related to the dimming direction signal and a failure with respect to the breaking of the light source 2 or a wire of the light source 2.

Accordingly, the external control device 3 can accurately distinguish between the failure of the signal line related to the dimming direction signal and the breaking of the light source 2 or wire of the light source 2 by whether or not the lighting state signal is outputted.

In this connection, a first frequency signal corresponds to the pulse A and a second frequency signal corresponds to the pulse B.

Referring to the table of FIG. 2 and the time chart of FIG. 3, a determination process of the control portion 1b will now be described. The changes that occur in the lighting state signal according to the determination will also be described.

(1) At the Time of Normal Operation (a) At the Usual Time

At the usual time, the dimming direction signal is not outputted from the dimming direction signal outputting portion 3a of the external control device 3. Therefore, the dimming direction signal detecting portion 1a of the lighting device 1 does not detect the dimming direction signal. In this case, the control portion 1b controls the light source 2 to execute the usual lighting by the light source 2. Further, the control portion 1b controls the lighting state signal outputting portion 1c to output the pulse cycle A as a lighting state signal, as shown by the period A in FIG. 3.

(b) At the Time of Dimming

On the other hand, at the time of dimming, the dimming direction signal (i.e., a pulse cycle signal) is outputted from the dimming direction signal outputting portion 3a of the external control device 3. Therefore, the dimming direction signal detecting portion 1a of the lighting device 1 detects the dimming direction signal. In this case, the control portion 1b controls the light source 2 to execute the dimmed lighting. Further, the control portion 1b controls the lighting state signal outputting portion 1c to output the pulse cycle B, which is different from the pulse A which is output at the usual time. Pulse cycle B is shown by the period B in FIG. 3.

(2) At the Time of Abnormal Operation (a) Breaking of a Wire Related to a Dimming Signal At the time of dimming, the dimming direction signal is outputted from the dimming direction signal outputting portion 3a of the external control device 3. However, when the signal wire related to the dimming signal is broken, the dimming direction signal detecting portion 1a of the lighting device 1 can not detect the dimming direction signal. Accordingly, in this case, the control portion 1b controls the light source 2 to continue to execute a usual lighting. I.e., the lighting of the light source 2 remains unchanged. Further, the control portion 1b continues to control the lighting state signal outputting portion 1c to output the pulse A as a lighting state signal. I.e., the lighting state signal remains unchanged. The external control device 3 expects to receive the pulse B at the time of dimming; however, the pulse A is received. Therefore, the external control device 3 can detect that the signal wire related to the dimming direction signal is broken. This state is shown by the period E in FIG. 3.

(b) Powering of a Signal Wire Related to a Dimming Signal

At the time of dimming, the dimming direction signal is outputted from the dimming direction signal outputting portion 3a of the external control device 3. However, in the case where the signal line related to the dimming signal is powered, the dimming direction signal detecting portion 1a of the lighting device 1 detects not the pulse cycle signal, but a high level signal. Accordingly, in this case, the control portion 1b controls the light source 2 to continuously execute a usual lighting. I.e., the lighting of the light source 2 remains unchanged. Further, the control portion 1b controls the lighting state signal outputting portion 1c to output the pulse A as a lighting state signal. The external control device 3 expects to receive the pulse B at the time of dimming; however, the pulse A is received. Therefore, the external control device 3 can detect that the dimming signal line is powered, as shown by the period C in FIG. 3.

(c) Grounding of a Signal Wire Related to a Dimming Signal

At the time of dimming, the dimming direction signal is outputted from the dimming direction signal outputting portion 3a of the external control device 3. However, in the case where the signal line related to the dimming signal is grounded, the dimming direction signal detecting portion 1a of the lighting device 1 detects not a pulse but a low level signal. Accordingly, in this case, the control device 1b controls the light source 2 to continuously execute a usual lighting. Further, the control portion 1b controls the lighting state signal outputting portion 1c to output the pulse A as a lighting state signal. The external control device 3 expects to receive the pulse B; however, the pulse A is received. Therefore, the external control device 3 can detect that the signal wire related to the dimming direction signal is grounded, as shown by the period D in FIG. 3.

(d) Failure of a Light Source

At the time of a failure of the light source, irrespective of whether the dimming direction signal is outputted, the control portion 1b of the lighting device 1 makes the lighting state signal output portion 1c stop outputting the lighting state signal. Accordingly, the external control portion 3 can not receive a lighting state signal which should be sent without fail at the time of usual lighting and also at the time of dimming lighting. Accordingly, it is possible to detect that the light source is abnormal. This situation is shown by the period F in FIG. 3.

Next, referring to FIG. 4, the dimming direction signal detecting portion and the lighting state signal outputting portion of the lighting device 1 according to an exemplary embodiment of the present invention will be explained in more detail.

The dimming direction signal detecting portion 1a includes an input circuit comprising a diode D1, a resistor R1 and an PNP transistor SW1; a differentiation circuit (hereinafter also referred to as an CR differentiation circuit) comprising a resistor R2, a condenser C1, a resistor R3 and an NPN transistor SW2; and an output circuit comprising a resistor R4 and a condenser C2.

Concerning the input circuit, an input terminal is coupled to the cathode side of the diode D1. Even when an offset is caused in the input terminal, the PNP transistor SW1 is turned on and off according to a level of a clock given to the input terminal.

Figure 5:
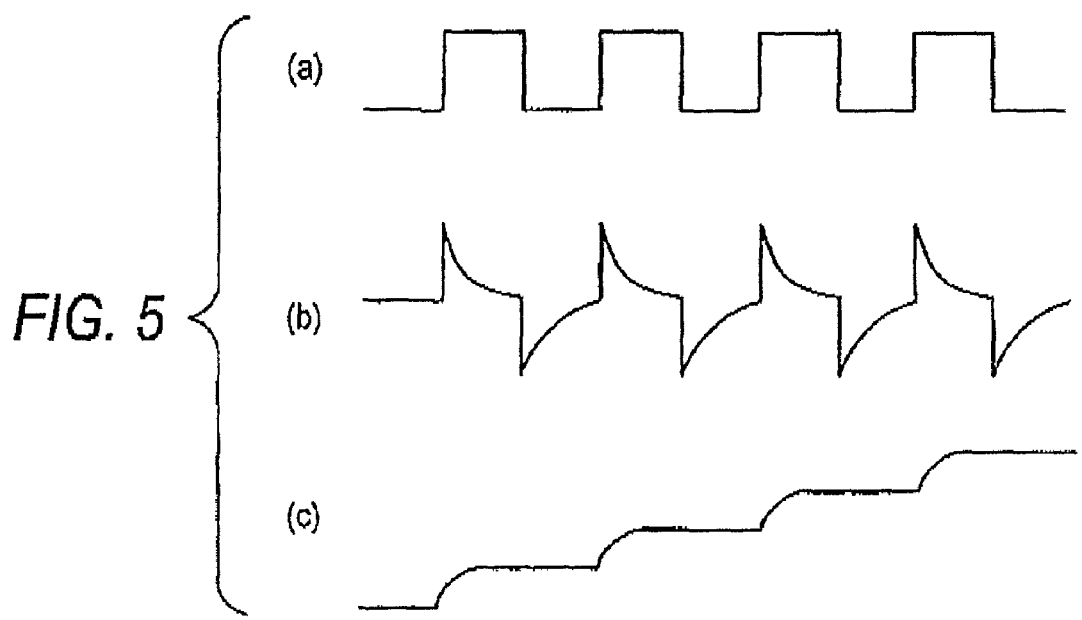
FIG. 5 is a view showing examples of output signals output from the lighting device of FIG. 4.

In the above constitution, when the dimming direction signal (shown in FIG. 5(a)) is inputted and the PNP transistor SW1 is turned on, the clock is differentiated by the differentiation circuit synchronously with the rise of the PNP transistor SW1. The differentiated clock signal is shown in FIG. 5(b).

The condenser C1 is electrically charged by a time constant determined by the resistor R3. An electric charge charged into the condenser C1 is discharged through the resistor R2. The time constant related to the charging and discharging action is set at a period of time shorter than the cycle of the clock. Therefore, the NPN transistor SW2 is turned on in a short period of time according to the differential output of the clock (shown in FIG. 5(b)).

When the NPN transistor SW2 is turned on in this way, the condenser C2 is electrically charged through the resistor R4. When a terminal voltage output from the output circuit (shown in FIG. 5(c)) exceeds a threshold value, a detection signal of the dimming direction signal is sent out to the lighting state signal outputting portion 1c. This detection signal is also sent out to the control portion 1b. When the control portion 1b receives this detection signal, the control portion 1b controls the light source 2 so that the light source 2 can be dimmed.

Figure 4:
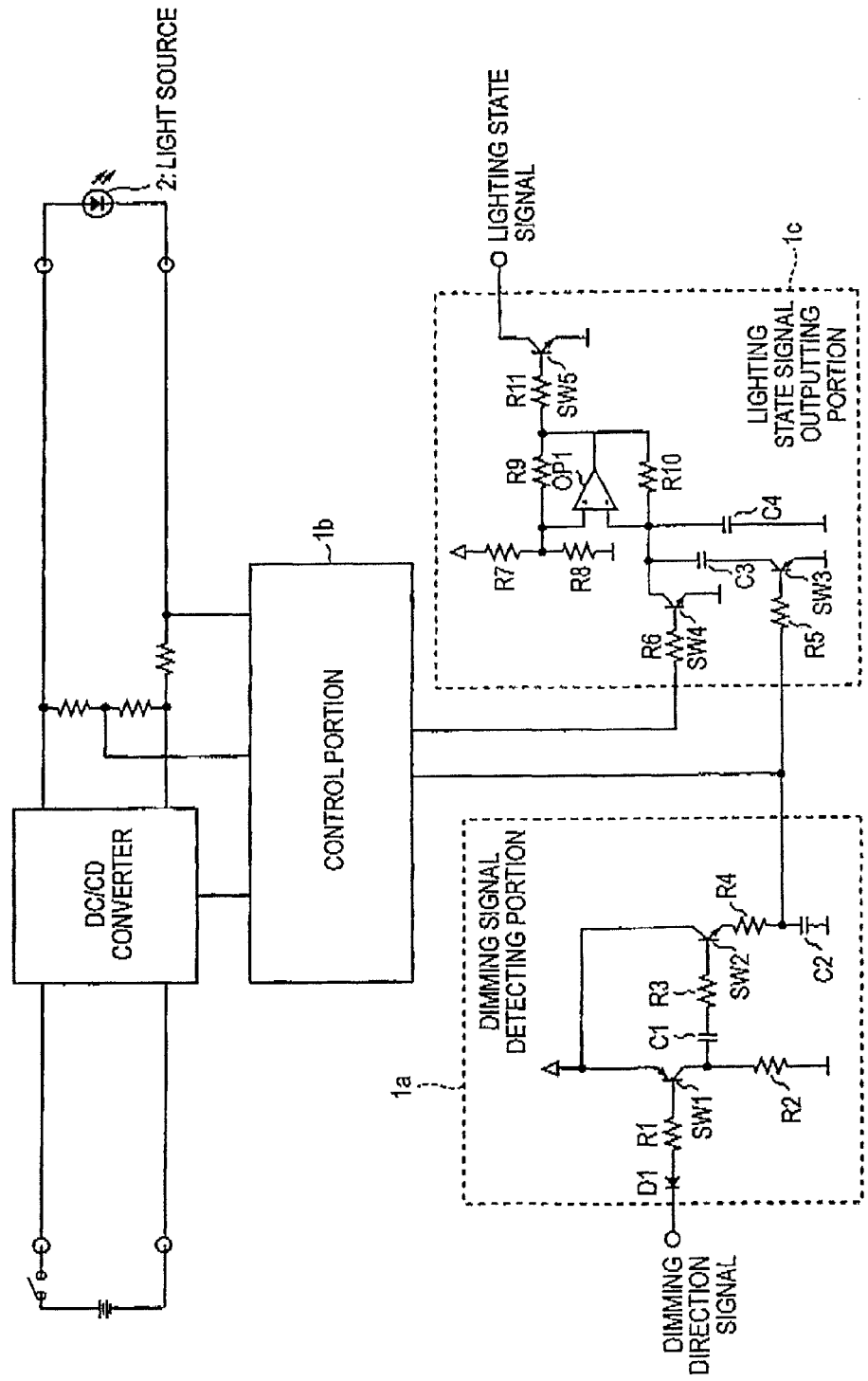
FIG. 4 is a detail view of the lighting device according to an exemplary embodiment of the present invention.

On the other hand, as shown in FIG. 4, the lighting state signal outputting portion 1c includes an input circuit comprising a resistor R5 and an NPN transistor SW3; an abnormality detecting circuit comprising a resistor R6 and an NPN transistor SW4; an RC oscillation circuit comprising resistors R7 to R10, condensers C3, C4 and a differential amplifier OP1; and an output circuit comprising a resistor R11 and an NPN transistor SW5.

The output voltage of the differential amplifier OP1 is fed back from the output terminal to the non-inverse input terminal through the resistor R9.

In the above constitution, at the usual lighting time, the NPN transistor SW4 is turned off. Under the condition that the condenser C4 is not electrically charged, the voltage divided by the resistors R7 and R8 is inputted into the non-inverse terminal of the differential amplifier OP1 and the condenser C4 is charged through the resistor R10 and the terminal voltage is gradually raised.

In a short time, when the terminal voltage a little exceeds the voltage of the non-inverse input terminal, an output of the differential amplifier OP1 is inverted. Then, the condenser C4 is electrically discharged at this time. Therefore, the terminal voltage is gradually decreased. In a short time, when the terminal voltage becomes a little lower than the voltage of the non-inverse input terminal, an output of the differential amplifier OP1 is inverted again. When this is repeated, an oscillation is caused.

The output of the differential amplifier OP1 is coupled to the base of the NPN transistor SW5 through the resistor R11. Since the output circuit is of the open collector type in which the output stage has one NPN transistor SW5 and the collector has not been connected yet, the lighting state signal is outputted from the collector of NPN transistor SW5.

On the other hand, at the time of dimming, a detection signal is given from the dimming direction signal detecting portion 1a to the input circuit and the NPN transistor SW3 is turned on. Therefore, the condenser C3 is also electrically charged and discharged. The oscillation frequency is determined by the electrostatic capacities of the condensers C3 and C4. In addition to the condenser C4, the condenser C3 is also electrically charged and discharged. Accordingly, the pulse cycle of the outputted lighting state signal is changed. For example, in a case in which the electrostatic capacity of the condenser C3 is 0.1 [mf] and the electrostatic capacity of the condenser C4 is 1.0 [mf], from the relation between C3 and C4, at the time of usual lighting, the oscillation frequency is 5 [Hz]. At the time of dimming, the oscillation frequency is 0.5 [Hz]. However, the values for C3 and C4, and the other components, may be set to alternate values. The values provided here are only by way of example.

At the time of an abnormality in the light source 2, a control signal is sent out from the control portion 1b to the abnormality detecting circuit.

The control signal is coupled to the base of the NPN transistor SW4 through the resistor R6 and the NPN transistor SW4 is turned on. Due to the foregoing, electrical charges of the condensers C3 and C4 are discharged through the NPN transistor SW4. Therefore, an output of the lighting state signal from the lighting state signal outputting portion 1c is stopped.

As explained above, according to exemplary embodiments of the present invention, it is possible to provide a lighting device for a vehicle capable of appropriately detecting a failure such as the breaking, powering or grounding of the line used for a dimming direction signal.

At the time of dimming, the lighting device changes a pulse cycle of the lighting state signal and the external control device determines a failure of the dimming direction signal. In the case where a failure is caused in the line of the dimming direction signal, although the external control device outputs a dimming direction signal, the lighting device can not detect the dimming direction signal and a cycle of the lighting state signal is not changed. Accordingly, it is possible for the external control device to determine that a failure has occurred in the line used for the dimming direction signal. Further, since the outputting of a pulse is stopped at the time of the breaking of wire, it is possible to distinguish between the failure of a line used in the light source 2 for the dimming direction signal, and the breaking of wire used for the dimming direction signal.

According to a first illustrative aspect of the present invention, a lighting device for a vehicle comprises: a light source;

a direction signal detecting portion for driving the light source, the direction signal detecting portion receiving a light control direction signal to direct brightness of the light source sent from an external control device; a control portion for controlling a light control state of the light source according to the light control direction signal; and a lighting state signal generating portion for sending a lighting state signal, which shows whether lighting of the light source is normal or abnormal, to the external control device.

Accordingly, by the dimming direction signal and the lighting state direction signal, it is possible to detect a failure such as a breaking, powering, or grounding of a signal wire related to the dimming direction signal. Further, it is possible to detect a failure of the light source.

According to a second illustrative aspect of the present invention, the light control direction signal may direct a normal lighting or a dimming lighting, and the control portion may control so that the light source can executes a normal lighting or a dimming lighting.

According to a third illustrative aspect of the present invention, the direction signal detecting portion may send a first frequency signal at the time of a normal lighting as a lighting state signal when the light source is normal, the direction signal detecting portion may send a second frequency signal at the time of a dimming lighting, and the direction signal detecting portion may stop sending the frequency signal at the time of the breaking of the light source or wire of the light source.

According to a fourth illustrative aspect of the present invention, the direction signal detecting portion may include at least a CR differentiation circuit. According to a fifth illustrative aspect of the present invention, the lighting state signal generating portion may include at least an RC oscillating circuit in which a differential amplifier is used.

According to the first illustrative aspect of the invention, it is possible to provide a lighting device for a vehicle capable of detecting a failure such as a breaking, a powering, or a grounding of a signal wire related to the dimming direction signal. Further, it is possible to provide a lighting device for a vehicle capable of detecting a failure of the light source.

According to the second illustrative aspect of the invention, by using one wire for a dimming direction signal, it is possible to send out a signal expressing a state of normal lighting of the light source or expressing a state of dimming lighting.

According to the third illustrative aspect of the invention, by using one wire for a lighting state signal, it is possible to send out a signal expressing a state of normal lighting of the light source or expressing a state of dimming lighting.

According to the fourth illustrative aspect of the invention, when CR differentiation circuit is employed, the circuit structure can be simplified.

According to the fifth illustrative aspect of the invention, when RC oscillating circuit, in which a differential amplifier is used, is employed, the circuit structure can be simplified.

While the present invention has been shown and described with reference to certain illustrative aspects and exemplary embodiments thereof, it will be understood by those skilled in the art that various changes in form and details may be made therein without departing from the spirit and scope of the invention as defined by the appended claims.

What is claimed is:

1. A lighting device for a vehicle comprising:
    a signal detecting portion which receives a light control direction signal;
    a control portion which controls a light source according to the light control direction signal; and
    a lighting state signal generating portion which outputs a lighting state signal based on the light control direction signal received by the signal detecting portion;
    the lighting state signal generating portion stops outputting the lighting state signal at a time at which the light source or a wire of the light source is broken.

2. The lighting device according to claim 1, wherein the light control direction signal indicates normal lighting or dim lighting, and
    the control portion controls the light source to execute normal lighting or dim lighting.

3. The lighting device according to claim 2, wherein the lighting state signal generating portion outputs the lighting state signal at a first frequency at a time of the normal lighting, and outputs the lighting state signal at a second frequency at a time of the dim lighting.

4. The lighting device according to claim 3, wherein the lighting state signal generating portion includes at least an RC oscillating circuit comprising a differential amplifier.

5. The lighting device according to claim 1, wherein the signal detecting portion comprises at least an RC differentiation circuit.

6. A lighting system for a vehicle, the lighting system comprising:
    a light source;
    an external control device; and
    a lighting device comprising:
        a signal detecting portion which receives a light control direction signal from the external control device;
        a control portion which controls the light source according to the light control direction signal; and
        a lighting state signal generating portion which outputs a lighting state signal to the external control device, the lighting state signal generated based on the light control direction signal received by the signal detecting portion;
    wherein the external control device comprises:
        a direction signal outputting portion which sends the light control direction signal to the lighting device; and
        a lighting state detecting portion which receives the lighting state signal from the lighting device;
    wherein the external control device is configured to determine a failure based on a comparison between the light control direction signal which is sent to the lighting device and the lighting state signal which is received from the lighting device, and to send a notification of the failure.

7. A lighting system for a vehicle, the lighting system comprising:
    a vehicle headlamp; and
    a lighting device comprising:
        a signal detecting circuit which receives a light control direction signal indicating a desired brightness level of the light source;
        a control circuit which controls a brightness level of the light source according to the light control direction signal; and
        a lighting state signal circuit which outputs a lighting state signal, the lighting state signal being a pulse cycle indicating the brightness level of the light source when the light source is operating in a normal condition, or a low level when the light source fails.

* * * * *